Dec. 24, 1957   M. F. CHUBB   2,817,697
CUPROUS CHLORIDE MAGNESIUM BATTERY
Filed April 6, 1954
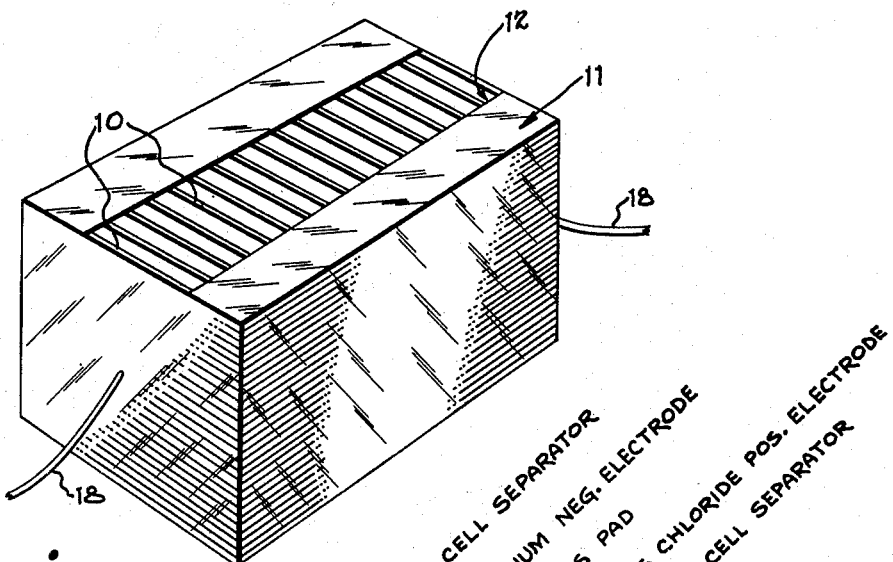
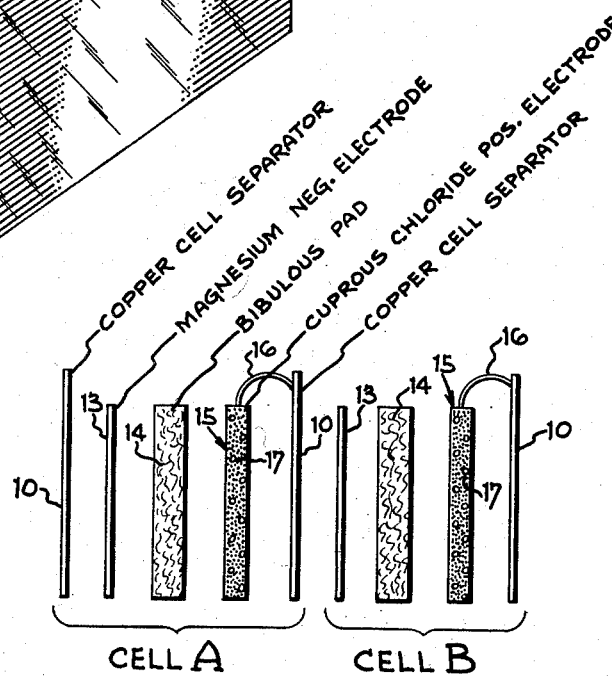
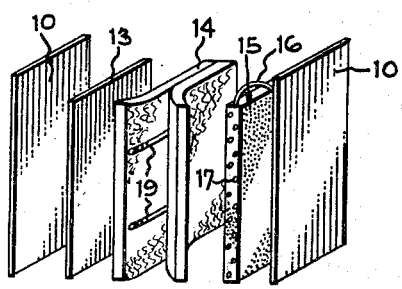
INVENTOR.
Melvin F. Chubb.
BY
Wood, Herron & Evans.
ATTORNEYS.

United States Patent Office 2,817,697
Patented Dec. 24, 1957

2,817,697

CUPROUS CHLORIDE MAGNESIUM BATTERY

Melvin F. Chubb, Joplin, Mo., assignor to The Eagle-Picher Company, Cincinnati, Ohio, a corporation of Ohio Application April 6, 1954, Serial No. 421,424

8 Claims. (Cl. 136—91)

This invention relates to a method of preventing overheating in cuprous chloride magnesium batteries. At present, batteries of this type are being manufactured in large quantities for a variety of purposes, for instance, weather balloons, and have the advantage over other known batteries of providing a large output of electrical energy in relation to the weight of the battery.

It is customary to manufacture these batteries in dry condition, i. e., with no electrolyte present, then activate the batteries by immersion in water immediately prior to use. The common type of cuprous chloride magnesium cell comprises a mass of porous cuprous chloride deposited on or secured to a metal screen as a positive electrode, a thin sheet of magnesium as a negative electrode, and a bibulous cell separator between the two electrodes, the cell separator being adapted to hold a predetermined amount of water as electrolyte. Such a battery produces current until one or the other of the active electrode chemicals is substantially consumed or until the electrolyte freezes or boils off.

The batteries of the present invention are particularly adapted for use on airborne equipment, weather observation ballons, etc., because of the relatively large amount of electrical power produced by such batteries in relation to their weight. However, at high altitudes the temperature is very low, thereby tending to freeze the electrolyte (water), and the pressure is much reduced, thereby increasing the tendency of the electrolyte to boil off. The objective or the ideal of the battery designer is to coordinate and proportion the elements which constitute the battery in such manner that the electrolyte does not boil off before the active chemicals of the electrodes are exhausted, yet to maintain the intensity of the chemical reactions at a level to produce enough heat to keep the electrolyte from freezing. Ultimately, if the active chemicals of the electrodes or either of them are exhausted before the electrolyte boils off, the electrolyte will freeze at low temperature.

The object of the present invention is to provide a method of preventing the electrolyte in a battery of the type in question from boiling off prior to chemical exhaustion but without impairing the efficiency of the battery from the point of view of producing electrical power. Otherwise stated, it is an object of this invention to provide a battery of the cuprous chloride-magnesium-water type which has a longer useful life than the batteries of this type heretofore provided.

The exact nature of the complex chemical current-producing reactions of this type of cell is not known in any substantial detail and much of the development has necessarily depended upon the employment of purely empirical methods. These batteries are "one-shot batteries" in that, after once being activated by the electrolyte, the physical and chemical disintegration of the positive electrode proceeds regardless of whether the circuit is opened or closed and the use of the batteries is therefore limited to purposes where a heavy continuous current for a limited period, such as several hours, is required. The recharging of such batteries is not possible, at least at present.

The general type of battery structure to which this invention is directed is disclosed in the patent to Fischbach et al., No. 2,636,060, issued April 21, 1953, and in the patent to Pucher et al., No. 2,640,090, issued May 26, 1953. Both of these patents disclose batteries which utilize the same chemical system as the batteries of this invention and also disclose battery structures to which the present invention may be applied. Battery structures to which the present invention may also be applied are disclosed in my copending applications Serial No. 181,248, filed August 24, 1950, for "Method of Making Electric Batteries," now Patent No. 2,684,481, and Serial No. 172,558, filed July 7, 1950, for "Electric Battery," now Patent No. 2,684,395. The present application is a divisional continuation in part of these copending applications. In the earlier filed of the two copending applications disclosure was provided of the use of a combination of ammonium and cadmium chlorides to improve the action of the aqueous electrolyte. The use of ammonium chloride was disclosed as desirable to accelerate the development of full power by the battery and the use of cadmium chloride was disclosed as desirable to prevent overheating. In the second filed of the above identified applications, the mixture of chlorides was incorporated in the battery by means of an impregnated string or thread which was imbedded within the bibulous pad which separated the electrodes.

I have now determined that cadmium chloride is a generally desirable component of cuprous chloride magnesium batteries, irrespective of whether or not ammonium chloride or other activating salts are used, and that the presence of the cadmium chloride in the electrolyte may be obtained by alloying metallic cadmium with the magnesium electrode, by incorporating cadmium chloride as a solid salt in the cuprous chloride electrode, by impregnating the bibulous electrode separator with cadmium chloride or by incorporating an impregnated string in the cell structure, as disclosed in the before identified patent application.

More particularly, the addition of a very small amount of cadmium chloride, for instance, enough to constitute 0.5% in relation to the weight of the electrolyte absorbed by the bibulous pad, prevents overheating sufficiently to materially prolong the life of the cell and the amount of cadmium chloride may be increased to 2.5%. If the cadmium is alloyed with the magnesium of the negative electrode, then cadmium chloride is formed as the cell discharges, the amount building up as the cell tends to overheat. An alloy constituted by 99% magnesium and 1% by weight cadmium is suitable for the fabrication of negative electrodes. Alternatively, about 1% cadmium chloride in relation to the weight of the cuprous chloride may be incorporated in the mix which is used to paste the positive plate. The electrode separators may be sprayed with a solution constituted by 10% anhydrous cadmium chloride in water, the total amount of cadmium chloride employed in any given cell being an amount adapted to provide a concentration in the electrolyte of 0.5% to 2.5% cadmium chloride.

No detailed theory can be offered as to why small quantities of cadmium chloride in the electrolyte tend to reduce overheating; but the tests indicate that when a battery of the type in question is activated, a great number of complex chemical reactions is initiated. Some of these reactions are directly responsible for the generation of electric current, but others, which may be termed "side reactions," generate heat without contributing to the overall electrical output of the battery. It is believed that in the complex electrolyte solution constituted by the interaction of cuprous chloride, magnesium and water, the cadmium of the cadmium chloride tends to precipitate at the magnesium electrode, thereby reducing the rate of its chemical activity and particularly retarding the side reactions which produce heat rather than electrical current. Nevertheless, the present invetnion is based primarily upon the empirical determination that the presence of a small percentage of cadmium chloride in a cell of this type reduces the tendency of the cell to overheat without correspondingly reducing the electrical output of the cell.

As an example of the efficacy of the present invention two batteries were given similar tests under similar conditions, the tests being carried out at a temperature of —60° F. The batteries were alike except for the fact that electrode separators of one battery were coated with enough cadmium chloride to provide a concentration of electrolyte of the order indicated. The minimum required voltage of these batteries was 95 volts. The battery without the cadmium chloride developed the minimum required voltage 11 minutes after dunking in water. The maximum voltage reached was 118 volts. The battery operated at or above the required minimum voltage for 136 minutes at the end of which time the electrolyte had boiled off, so that the battery was hot and dried out. The similar battery containing the cadmium chloride required 20 minutes to reach the minimum required voltage of 95 volts. This battery reached a maximum voltage of 116 volts and operated at a voltage at or above required minimum voltage for 192 minutes. By the end of this period the chemical reaction had decreased to such a point that the electrolyte froze. The first battery provided the electrical power which it was designed to give for a period of 2 hours and 16 minutes, whereas the second battery, which contained the cadmium chloride, operated as required for 3 hours and 16 minutes.

As indicated in my two earlier filed applications, ammonium chloride may be used in addition to the cadmium chloride in order to accelerate the development of peak voltage, or other salts may be employed in the electrolyte to produce particularly desired effects. The mechanism of incorporating the cadmium chloride in the cell may be as indicated in either of my identified applications; that is, by impregnating a bibulous electrode separator or a thread of string incorporated therein with cadmium chloride or, alternatively, the cadmium chloride may be incorporated in the pasted cuprous chloride positive electrode or metallic cadmium may be alloyed with the magnesium of the negative electrode. Alternatively, from the point of view of method, the desired amount of cadmium chloride may be dissolved in the water which is to serve as the electrolyte for the battery, but from the point of view of convenience, it is considered better to incorporate the required amount of cadmium chloride in the battery structure so that it is not necessary to prepare a special electrolyte when the battery is used.

The invention is disclosed primarily in relation to a pasted cuprous chloride magnesium battery of the pile type, wherein the electrolyte is held on bibulous electrode spacers or bibulous pads which are disposed between the positive and negative electrodes of each cell. In the drawings:

Figure 1 is a perspective view showing a battery incorporating the principles of the present invention.

Figure 2 is a diagrammatic exploded view showing the components of two cells, designated A and B respectively, of the battery of Figure 1.

Figure 3 is a diagrammatic perspective view showing the components of a modified form of cell.

The construction of the battery of Figure 1 follows the teachings of the two patents which have been referred to previously. It incorporates a plurality of copper cell separator plates which are designated generally by the numeral 10. The battery is enclosed completely on three sides and partly on the fourth side by a wrap-around sheet of plastic material 11 which, in the preferred embodiment, is a hardened vinyl plastisol composition, the plastic forming liquid proof seals and defining, in conjunction with the copper plates 10, a plurality of cell compartments. The partially enclosed side of the battery assembly provides an opening 12 through which water electrolyte may be introduced to activate the cells.

Each cell of the battery may consist of a copper cell separator 10, a magnesium negative electrode 13, a bibulous pad 14, a cuprous chloride positive electrode 15 and a copper cell separator 10 which is connected electrically as at 16 to the positive, cuprous chloride electrode. Preferably the positive electrode consists of a porous paste of cuprous chloride which is carried by a bronze screen 17. Two leads such as the ones shown at 18—18 may be soldered or otherwise attached to the copper plates at the respective opposite ends of the series connected cells of the battery.

Cadmium may be incorporated in each cell of the battery in several ways: for example, by alloying metallic cadmium with the magnesium of the negative electrode 13, the alloy being in the proportion of 99% magnesium to 1% of cadmium by weight; cadmium chloride as a solid salt may be incorporated in the porous paste of cuprous chloride of positive electrode 15, the proportion of cadmium chloride being 1% by weight; or, the bibulous pad 14 may be impregnated with cadmium chloride. The modification shown in Figure 3 illustrates an additional way of incorporating cadmium chloride in the battery structure. In this instance, the bibulous pad 14 comprises two sections having one or more cadmium chloride saturated threads, such as those indicated at 17—17, sandwiched between them.

Inherently, the cuprous chloride magnesium battery may be utilized in other structural forms with thin electrode separators and electrolyte in excess of the amount which they would hold. The cadmium chloride may be used in such batteries with appropriate adjustment of the amount in relation to the design and requirement of the battery. While 0.5% concentration of the cadmium chloride is necessary to be significant in the pile type battery which holds little electrolyte, an equivalent amount of cadmium chloride at lower concentration in electrolyte is effective in cuprous chloride magnesium batteries designed for different functional purposes. Further, the amount of cadmium chloride used may be substantially increased over the ranges indicated. The point is that the cadmium chloride, whether present originally as such or formed in the chemical reactions, is effective to reduce chemical activity at the negative, magnesium electrode and particularly to arrest or retard or inhibit wasteful, heat generating, side reactions. In other words, the cadmium chloride acts as if it were an inhibitor in respect to the rate of chemical activity at the negative electrode, thereby prolonging the current-yielding life of the battery without offsetting disadvantages.

Having described my invention I desire to be limited only to the following claims:

1. An electrolytic cell adapted to be activated by an aqueous electrolyte, said cell comprising a positive electrode constituted by a mass of porous cuprous chloride, a negative electrode constituted by a sheet of magnesium, an electrode separator and an inhibitor of heat producing chemical reactions, said inhibitor exposed to said electrolyte, said inhibitor being adapted to produce cadmium ions in the electrolyte, said inhibitor being present in an amount adapted to produce a concentration in the electrolyte substantially in the range of 0.5% to 2.5% cadmium chloride.

2. An electrolytic cell adapted to be activated by an aqueous electrolyte, said cell comprising a positive electrode constituted by a mass of porous cuprous chloride, a negative electrode constituted by a sheet of magnesium, an electrode separator and an inhibitor of heat producing chemical reactions, said inhibitor exposed to said electrolyte, said inhibitor being a member of the class consisting of cadmium and cadmium chloride, said inhibitor being present in an amount adapted to produce a concentration in the electrolyte substantially in the range of 0.5% to 2.5% cadmium chloride.

3. An electrolytic cell adapted to be activated by an aqueous electrolyte, said cell comprising a positive electrode constituted by a mass of porous cuprous chloride, a negative electrode constituted by a sheet of magnesium, an electrode separator and cadmium chloride as an inhibitor of heat producing chemical reactions, said inhibitor exposed to said electrolyte, said inhibitor being present in an amount adapted to produce a concentration in the electrolyte substantially in the range of 0.5% to 2.5% cadmium chloride.

4. The electrolytic cell of claim 1 wherein a small amount of cadmium is alloyed with the magnesium which constitutes the negative electrode.

5. The electrolytic cell of claim 3 wherein a small amount of cadmium chloride is incorporated in the mass of cuprous chloride which constitutes the positive electrode.

6. The electrolytic cell of claim 3 wherein a small amount of cadmium chloride is deposited on the electrode separator.

7. The method of preventing the overheating of an electrolytic cell comprising a positive electrode constituted by a porous mass of cuprous chloride, a magnesium negative electrode, an electrode separator and an aqueous electrolyte, said method comprising incorporating a small amount of cadmium ions in said electrolyte during the discharge of the cell, the amount of cadmium being such as to provide a concentration in the electrolyte substantially in the range of 0.5% to 2.5% cadmium chloride.

8. The method of preventing the overheating of an electrolytic cell comprising a positive electrode constituted by a porous mass of cuprous chloride, a magnesium negative electrode, a bibulous electrode separator adapted to hold sufficient electrolyte to discharge the cell and an aqueous electrolyte, said method comprising incorporating a small amount of cadmium ions in said electrolyte during the discharge of the cell, the amount of cadmium being such as to provide a concentration in the electrolyte substantially in the range of 0.5% to 2.5% cadmium References Cited in the file of this patent

UNITED STATES PATENTS

| | | |
|---|---|---|
| 1,316,760 | Benner et al. | Sept. 23, 1919 |
| 2,422,045 | Ruben | June 10, 1947 |
| 2,616,940 | Reid | Nov. 4, 1952 |
| 2,636,060 | Fischbach et al. | Apr. 21, 1953 |
| 2,640,090 | Pucher et al. | May 26, 1953 |